US012459776B2

(12) United States Patent
Kitagawa

(10) Patent No.: US 12,459,776 B2
(45) Date of Patent: Nov. 4, 2025

(54) CONVEYANCE APPARATUS

(71) Applicant: CANON KABUSHIKI KAISHA, Tokyo (JP)

(72) Inventor: Ryutaro Kitagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 18/191,648

(22) Filed: Mar. 28, 2023

(65) Prior Publication Data

US 2023/0339716 A1 Oct. 26, 2023

(30) Foreign Application Priority Data

Apr. 22, 2022 (JP) ................................ 2022-071063

(51) Int. Cl.
*B65H 43/00* (2006.01)
*B41J 11/00* (2006.01)

(52) U.S. Cl.
CPC ............ *B65H 43/00* (2013.01); *B41J 11/009* (2013.01); *B65H 2553/40* (2013.01); *B65H 2601/25* (2013.01)

(58) Field of Classification Search
CPC .... B65H 7/20; B65H 43/00; B65H 2511/416; B65H 2553/40; G03G 15/5029; B41J 11/009; B41J 11/0075; B41J 15/042
See application file for complete search history.

(56) References Cited

U.S. PATENT DOCUMENTS

| | | | | |
|---|---|---|---|---|
| 11,325,401 | B2 * | 5/2022 | Kanno | B41J 11/0085 |
| 2020/0264814 | A1 * | 8/2020 | Morimoto | G06K 15/16 |
| 2022/0063306 | A1 * | 3/2022 | Tokuda | B41J 13/103 |
| 2022/0321732 | A1 * | 10/2022 | Horade | H04N 1/3878 |
| 2022/0394146 | A1 * | 12/2022 | Kitagawa | H04N 1/00 |
| 2023/0009567 | A1 * | 1/2023 | Ishihara | B65H 7/02 |

FOREIGN PATENT DOCUMENTS

| | | | | |
|---|---|---|---|---|
| JP | H10732681 | A | | 2/1995 |
| JP | 4019297 | B2 | * | 12/2007 |
| JP | 2013199013 | A | * | 10/2013 |
| JP | 2020138824 | A | | 9/2020 |

* cited by examiner

*Primary Examiner* — Jennifer Bahls
(74) *Attorney, Agent, or Firm* — Canon U.S.A., Inc. IP Division

(57) ABSTRACT

A conveyance apparatus includes a set unit, a conveyance unit, a first sensor, a control unit, and a platen. The set unit allows a roll sheet to be set. The conveyance unit convey the roll sheet. The first sensor acquires data to be used to identify a type of the roll sheet during sheet conveyance by the conveyance unit. The control unit controls an operation on the roll sheet based on a result of the data acquisition by the first sensor. The platen supports the roll sheet. The first sensor is disposed between a position at which the roll sheet is set and the platen on a conveyance path of the roll sheet.

12 Claims, 8 Drawing Sheets

CONVEYANCE APPARATUS

BACKGROUND

Field

The present disclosure relates to a conveyance apparatus.

Description of the Related Art

In a recording apparatus that records images on recording media, each recording medium is conveyed to the position at which recording is performed. The recording apparatus uses the conveyance speed and the strengths of performing suction of the recording material at a platen and holding the recording material by conveyance rollers, all of which are appropriate for each type of recording medium to prevent the recording medium from being soiled, damaged, or jammed when the recording medium is conveyed.

Japanese Patent Application Laid-Open No. H7-032681 discusses a configuration in which the type of the sheet is identified in advance prior to conveyance of a sheet, and the conveyance speed is controlled.

According to the configuration discussed in Japanese Patent Application Laid-Open No. H7-032681, it can take time to convey the sheet due to the identification of the sheet type prior to the conveyance of the sheet.

SUMMARY

The disclosed conveyance apparatus is directed towards preventing more time to convey a sheet while reducing conveyance failures.

According to an aspect of the present disclosure, a conveyance apparatus includes a set unit configured to allow a roll sheet to be set, a conveyance unit configured to convey the roll sheet, a first sensor configured to acquire data to be used to identify a type of the roll sheet during sheet conveyance by the conveyance unit, a control unit configured to control an operation on the roll sheet based on a result of the data acquisition by the first sensor, and a platen configured to support the roll sheet, wherein the first sensor is disposed between a position at which the roll sheet is set and the platen on a conveyance path of the roll sheet.

Further features of the present disclosure will become apparent from the following description of exemplary embodiments with reference to the attached drawings.

DESCRIPTION OF THE EMBODIMENTS

Hereinafter, exemplary embodiments will be described with reference to the drawings. The components described in each of the exemplary embodiments are merely examples, and the descriptions of the exemplary embodiments are not intended to limit the scope of the disclosure.

Figure 1:
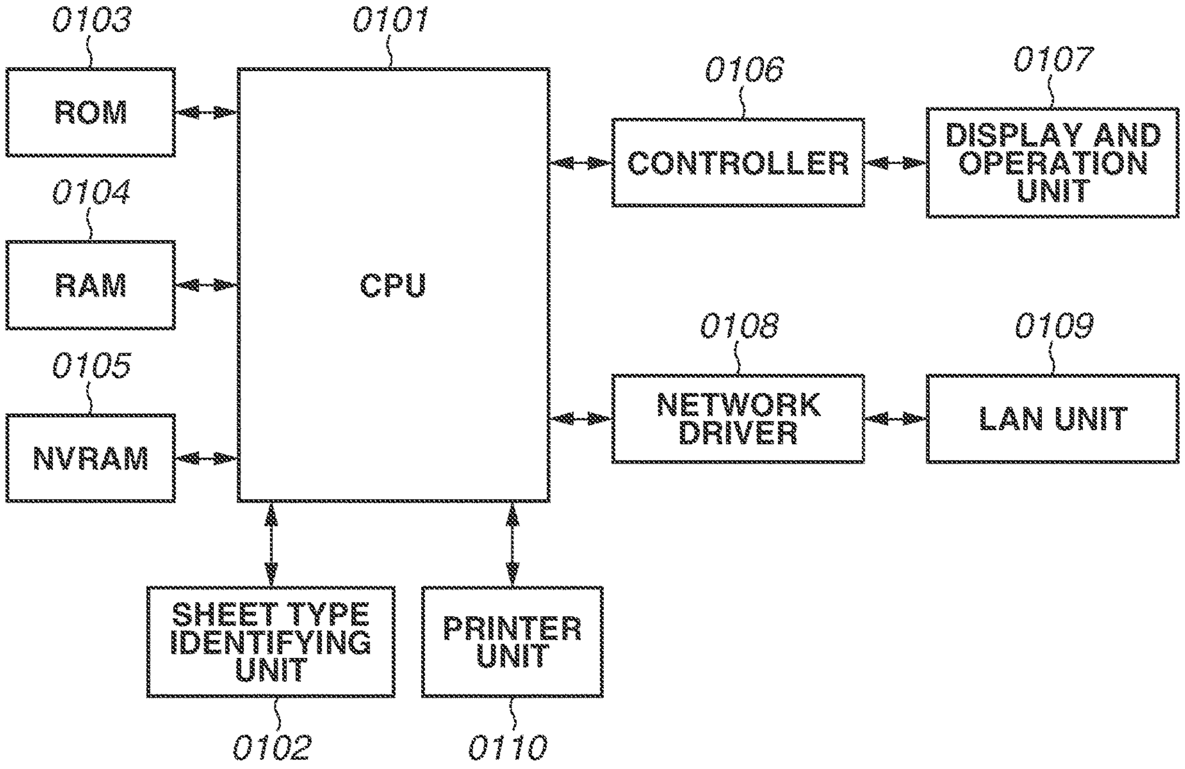
FIG. 1 is a block diagram illustrating the configuration of a recording apparatus according to an exemplary embodiment.

FIG. 1 is a block diagram illustrating the configuration of a recording apparatus 1 according to an exemplary embodiment.

The recording apparatus 1 includes a sheet type identifying unit 0102 having a function of identifying a type (a sheet type) of sheet medium. The sheet type identifying unit 0102 is controlled by a central processing unit (CPU) 0101. A read-only memory (ROM) 0103 includes control execution codes (programs) for the recording apparatus 1. A random access memory (RAM) 0104 stores data about the measurement of a sheet as a temporary record in the control of the recording apparatus 1. A non-volatile random access memory (NVRAM) 0105 is a non-volatile memory that stores records of various types of data used in maintenance of the recording apparatus 1, sensor values used in sheet type identification, and sheet type identification results. Examples of sheet media in the present exemplary embodiment include paper, plastic, and cloth. Paper will be described as an example of a sheet medium, although the sheet medium is not limited to the paper.

The recording apparatus 1 also includes a display and operation unit 0107 that includes user interfaces such as a liquid crystal display (LCD), a light emitting diode (LED), keys, and a touch panel. These user interfaces are used to perform a setting operation and an execution operation of each function of the recording apparatus 1. The recording apparatus 1 controls display details and operation states of such operations via a controller 0106.

In addition, the recording apparatus 1 includes a local area network (LAN) unit 0109 for connecting the recording apparatus 1 to a server via a network or an interface to an external connection device. Herein, the recording apparatus 1 exchanges execution commands and data with the external connection device or the server via a network driver 0108. For example, in recording performed on a printer unit 0110, image data is transferred from the external connection device via the network driver 0108.

Figure 2:
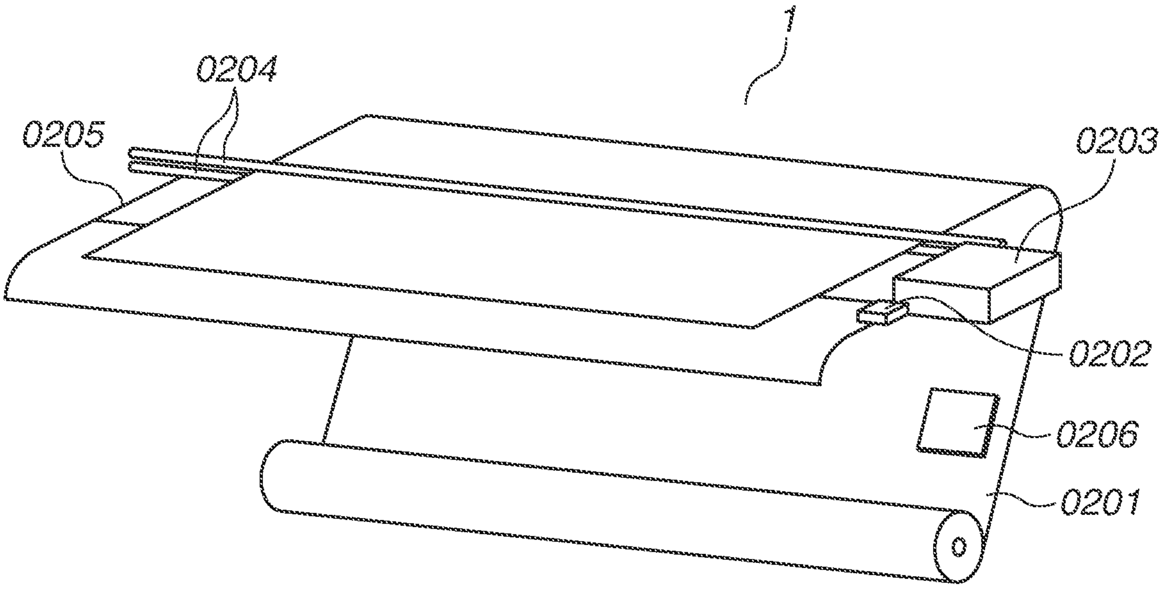
FIG. 2 is a schematic diagram illustrating a configuration of the recording apparatus according to the present exemplary embodiment.

FIG. 2 is a schematic diagram illustrating a configuration of the recording apparatus 1 according to the present exemplary embodiment.

A roll sheet 0201 that is recording paper in a roll is installed into the recording apparatus 1. The roll sheet 0201 is nipped and held between a conveyance roller pair 0204 from above and below. The conveyance roller pair 0204 is rotated to feed the roll sheet 0201 frontwards (convey toward the front in FIG. 2) and feed the roll sheet 0201 backwards (conveyed toward the rear in FIG. 2). The conveyance roller pair 0204 is rotated by a driving force transmitted from a motor (not illustrated) disposed therein. The roll sheet 0201 is supported by a platen 0205 from below.

A carriage 0203 moves from the right to the left and from the left to the right in FIG. 2. A recording head is mounted on the carriage 0203, and ink is ejected from the recording head to record an image on a recording sheet.

In addition, the recording apparatus 1 includes a cutter unit 0202. The cutter unit 0202 moves from the right to the left in FIG. 2 to cut the roll sheet 0201.

When the roll sheet 0201 is conveyed by the sheet feeding operation, the roll sheet 0201 passes a sheet type identifying sensor 0206 and then conveyed to the platen 0205. The sheet type identifying sensor 0206 acquires a sensor value that is used to identify a sheet type. The sheet type identifying sensor 0206 will be described in detail below.

Figure 3:
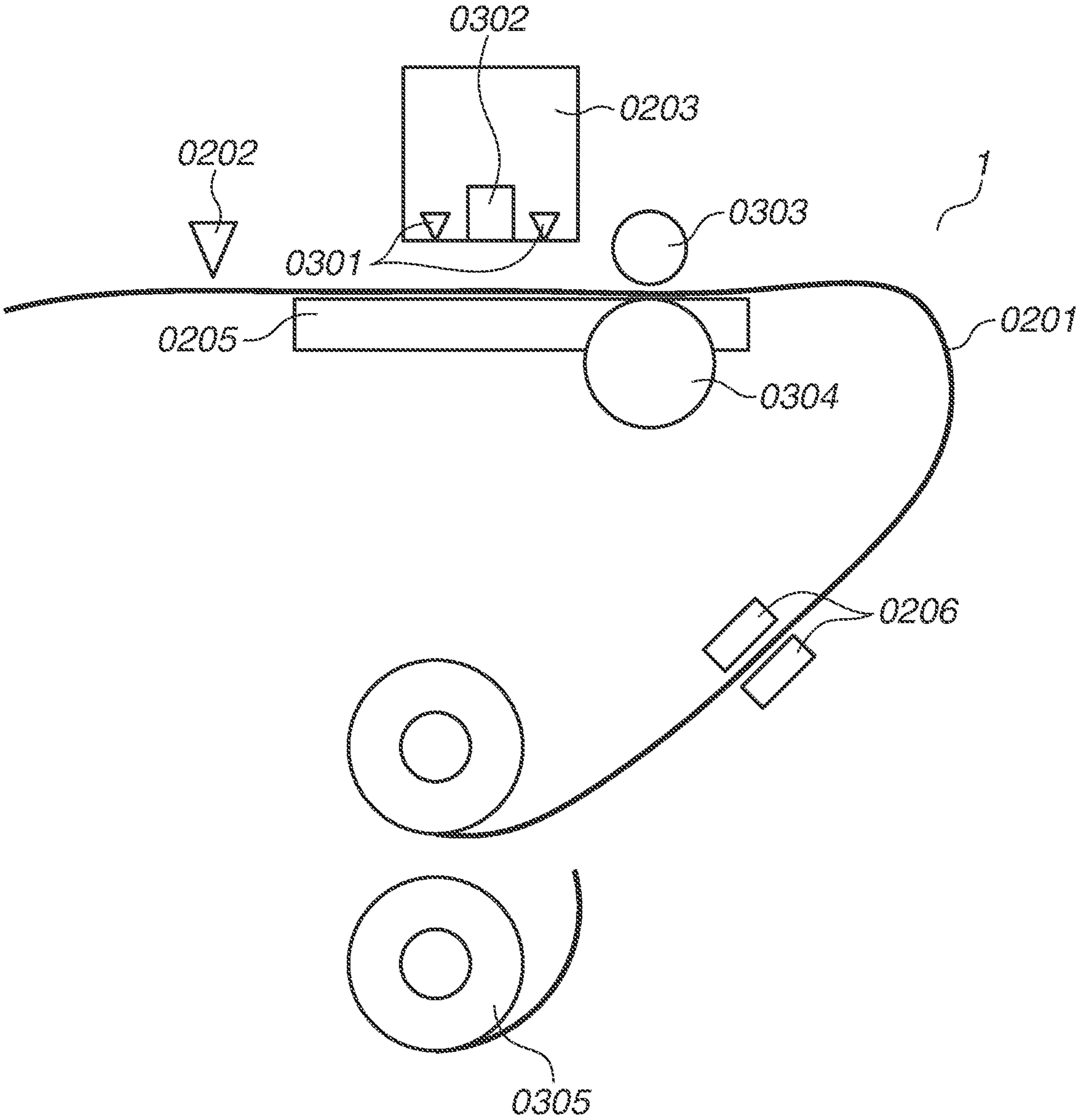
FIG. 3 is a schematic cross-sectional diagram illustrating a sheet conveyance configuration of the recording apparatus according to the present exemplary embodiment.

FIG. 3 is a schematic cross-sectional diagram illustrating a sheet conveyance configuration of the recording apparatus 1 according to the present exemplary embodiment.

The conveyance roller pair 0204 includes an upper conveyance roller 0303 and a lower conveyance roller 0304. The roll sheet 0201 is nipped and held between the upper conveyance roller 0303 and the lower conveyance roller 0304 from above and below. The upper conveyance roller 0303 and the lower conveyance roller 0304 are rotated to convey the roll sheet 0201 from the right to the left in FIG. 3.

As illustrated in FIG. 2, the recording apparatus 1 includes the carriage 0203 and the cutter unit 0202. The carriage 0203 includes the recording head, and ink is ejected from a nozzle 0301 mounted to the recording head to perform printing on a recording sheet. The carriage 0203 also includes a multi-sensor 0302 including an LED. Light emitted from the LED is reflected from a recording sheet and received by the multi-sensor 0302 to acquire a sensor value.

The recording apparatus 1 includes a roll sheet 0305 that differs from the roll sheet 0201. A user selects a roll sheet for use, and the selected sheet is fed. Herein, the roll sheet 0201 may be retracted to feed the roll sheet 0305. Even in such a case, the result of the detection by the sheet type identifying sensor 0206 is stored in the NVRAM 0105, which eliminates the need to identify the sheet type of the roll sheet 0201 fed next time. Processing to be performed when the sheet is re-fed will be described below.

Figure 4:
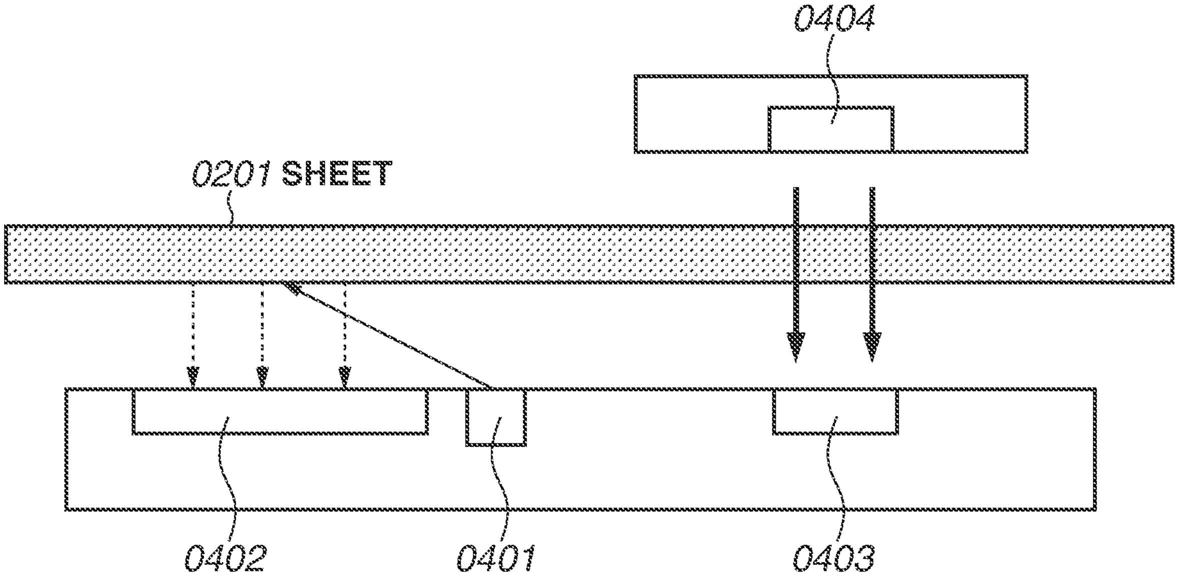
FIG. 4 is a schematic diagram illustrating a sheet type identifying sensor according to the present exemplary embodiment.

FIG. 4 is a schematic diagram illustrating the sheet type identifying sensor 0206 in the recording apparatus 1 according to the present exemplary embodiment.

The sheet type identifying sensor 0206 detects the surface property and the grammage of the roll sheet 0201. The surface property is detected with a line sensor including a white LED 0401 and a complementary metal-oxide-semiconductor (CMOS) sensor 0402. Light emitted from the white LED 0401 is reflected by the roll sheet 0201, and the resultant reflected light is received by the CMOS sensor 0402 to acquire a sensor value. The line sensor detects heights or lengths of asperity and a fiber orientation as a surface property. The line sensor is also used to determine whether the roll sheet 0201 has been conveyed up to the sheet type identifying sensor 0206 and has reached a detection position at which the surface property and the grammage can be detected. The line sensor can determine whether the roll sheet 0201 has reached the detection position based on the sensor value of the CMOS sensor 0402 because the amount of light of the white LED 0401 reflected differs depending on whether the sheet is present.

On the other hand, an ultrasonic sensor is used to detect a grammage. The ultrasonic sensor includes an ultrasonic wave generation unit 0404 and an ultrasonic wave receiving unit 0403. An ultrasonic wave that is emitted from the ultrasonic wave generation unit 0404 is received by the ultrasonic wave receiving unit 0403, and the grammage of the roll sheet 0201 is measured based on the degree of ultrasonic wave attenuation that occurs while the ultrasonic wave passes through the roll sheet 0201. The sheet type of the roll sheet 0201 is identified based on the surface property and the grammage acquired by the sheet type identifying sensor 0206, and a mechanical operation setting is adjusted based on the result of the sheet type identification. The surface property and the grammage of each sheet are set beforehand and stored in the ROM 0103. The values stored in the ROM 0103 and the sheet type identification result acquired by the sheet type identifying sensor 0206 are compared, and a sheet type is identified. A sheet having a closest value can be determined to be the sheet of the roll sheet 0201. If the ROM 0103 stores a range of values for a sheet, a sheet type in the range in which the sheet identification result falls can be determined to be the sheet type of the roll sheet 0201. In this case, a plurality of sheet types may be candidates.

Processing for adjusting a mechanical operation setting based on a sheet type identification result will be described in detail below.

In the present exemplary embodiment, the sheet type identifying sensor 0206 is used to detect the surface property and the grammage of the roll sheet 0201 to identify the sheet type of the roll sheet 0201. However, a sensor to be used is not limited thereto. A combination of a scanner, a temperature sensor, a humidity sensor, and a tactile sensor may be used. As a method of identifying a sheet type other than a simple pattern matching through threshold processing, a method for data analysis such as machine learning may be employed to identify a sheet type.

Figure 5:
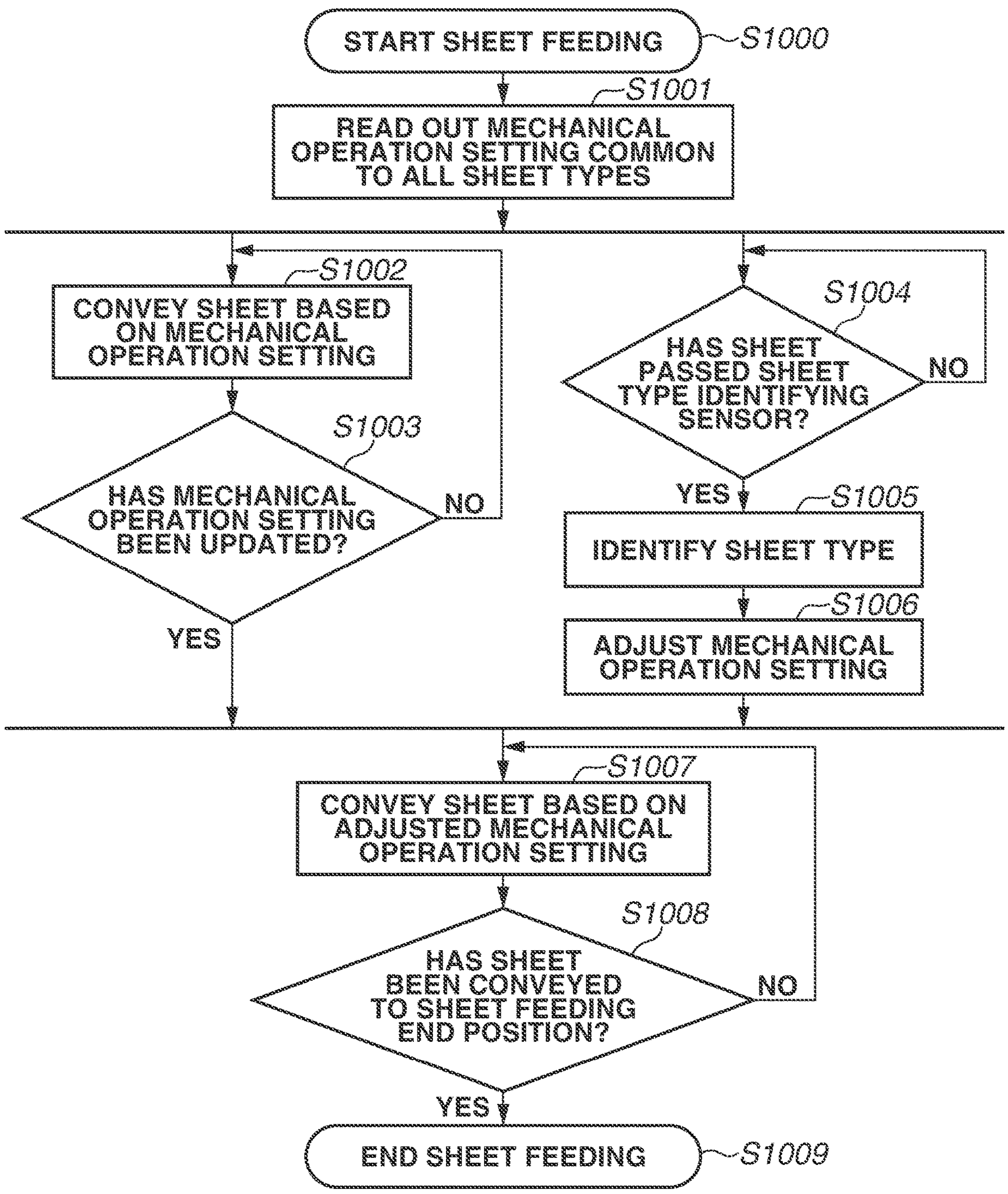
FIG. 5 is a flowchart illustrating processing performed when a sheet is fed for the first time according to the present exemplary embodiment.

FIG. 5 is a flowchart illustrating processing performed when a sheet is fed for the first time according to the present exemplary embodiment. The processing is carried out by the CPU 0101 following programs stored in the ROM 0103 to control units.

When a user sets a new roll sheet into a set unit in the recording apparatus 1 and instructs the start of sheet feeding from an operation panel, the processing proceeds to step S1000 in which sheet feeding is started. The processing may proceed to step S1000 at a timing when a sensor for detecting an installation of a roll sheet mounted to the recording apparatus 1 detects an installation of a roll sheet.

Next, in step S1001, the recording apparatus 1 reads out a mechanical operation setting common to all sheet types from the ROM 0103. The "mechanical operation setting common to all sheet types" to be read out herein represents a mechanical operation setting value that is set so that an operational failure such as a sheet jam is unlikely to occur with every sheet type possible to be set.

Next, in step S1002, the recording apparatus 1 conveys a sheet based on the mechanical operation setting read out in step S1001. Next, in step S1003, the CPU 0101 determines whether the mechanical operation setting has been updated. If the CPU 0101 determines that the mechanical operation setting has not been updated (NO in step S1003), the processing returns to step S1002. The processing in step S1002 is repeated as long as the CPU 0101 determines that the mechanical operation setting has not been updated in step S1003.

While the processing in steps S1002 and S1003 are repeated, the processing in step S1004 is executed in a parallel manner. In step S1004, the CPU 0101 determines whether the sheet has passed the sheet type identifying sensor 0206. If the CPU 0101 determines that the sheet has not passed the sheet type identifying sensor 0206 (NO in step S1004), the processing in step S1004 is executed again to await passage of the sheet. After the processing in steps S1002 and S1003 are repeated some times, the sheet passes the sheet type identifying sensor 0206. The CPU 0101 determines that the sheet has passed the sheet type identifying sensor 0206 (YES in step S1004), and the processing proceeds to step S1005 in which the type of the sheet is identified.

In step S1005, the sheet type identifying sensor 0206 illustrated in FIG. 4 acquires a sensor value, and the type of the sheet that is currently fed is identified. Herein, it is conceivable that not all results of the sheet type identification indicate that one sheet type is determined, and there are a plurality of sheet type candidates that are highly possible sheet types. Hereinafter, such an identification result is referred to as a sheet type estimation result. When the sheet type estimation result is acquired, the processing proceeds to step S1006 in which a mechanical operation setting is adjusted. In step S1006, a mechanical operation setting is adjusted to a setting suitable for the sheet type based on the sheet type estimation result. The processing in step S1006 will be described in detail below.

When the processing in step S1006 is performed, in the parallel processing in step S1003, the CPU 0101 determines that the mechanical operation setting has been adjusted (YES in step S1003), and the processing proceeds to step S1007.

In step S1007, the recording apparatus 1 conveys the sheet based on the mechanical operation setting adjusted in step S1006. In step S1008, the CPU 0101 determines whether the sheet has been conveyed to a sheet feeding end position. If the CPU 0101 determines that the sheet has not been conveyed to the sheet feeding end position (NO in step S1008), the processing returns to step S1007. The processing in step S1007 is repeated while the CPU 0101 determines that the sheet has not been conveyed to the sheet feeding end position (NO in step S1008). After the processing in step S1007 is repeated a certain number of times, the sheet is conveyed to the sheet feeding end position, and thus the CPU 0101 determines that the sheet has been conveyed to the sheet feeding end position (YES in step S1008). Then, the processing proceeds to step S1009 in which the sheet feeding for the first time ends.

Figure 6:
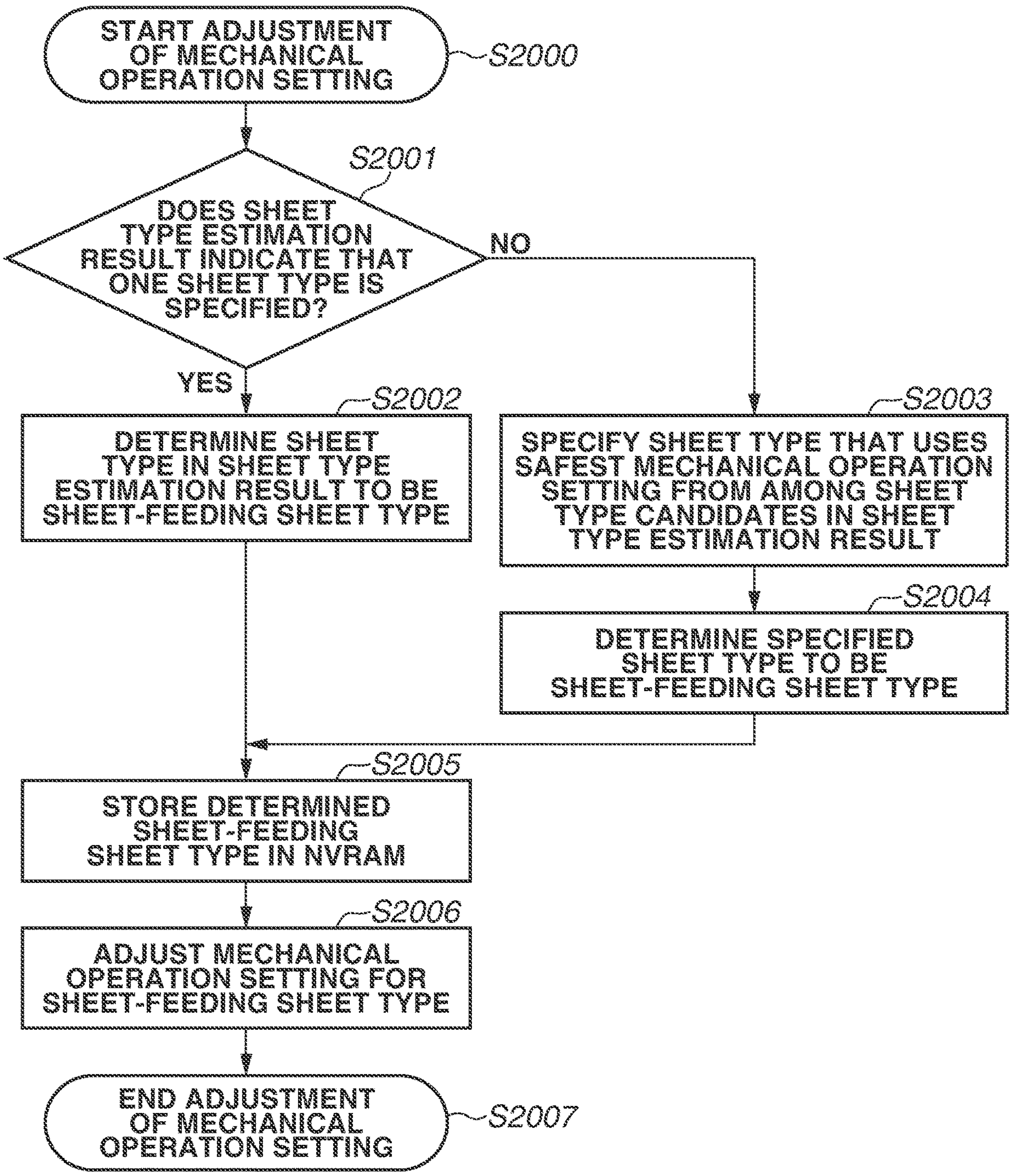
FIG. 6 is a flowchart illustrating processing for determining a mechanical operation setting according to the present exemplary embodiment.

FIG. 6 is a flowchart illustrating processing for adjusting a mechanical operation setting according to the present exemplary embodiment. The adjustment processing illustrated in FIG. 6 is performed in step S1006 described above with reference to FIG. 5 that illustrates the sheet feeding processing for the first time, and in step S3002 described below with reference to FIG. 7 that illustrates sheet feeding processing for the second and subsequent times. In each sheet feeding processing, when processing for adjusting a mechanical operation setting is started, the processing proceeds to step S2000 in which adjustment of a mechanical operation setting is started.

In the mechanical operation setting adjustment, in step S2001, the CPU 0101 first determines whether the sheet type estimation result indicates that one sheet type is specified. Herein, if the sheet type estimation result indicates that one sheet type is specified (YES in step S2001), the processing proceeds to step S2002 in which the sheet type is determined to be the sheet type at the time of sheet feeding. On the other hand, if the sheet type estimation result does not indicate that one sheet type is specified (NO in step S2001), the processing proceeds to step S2003. In step S2003, the sheet type that uses the safest mechanical operation setting is specified from among the sheet type candidates in the sheet type estimation result.

The term "safe mechanical operation" represents a mechanical operation unlikely to cause a sheet jam, soiling of a sheet, and sheet damage. Subsequently, in step S2004, the specified sheet type is determined to be a sheet type at the time of feeding (hereinafter also referred to as a sheet-feeding sheet type).

Next, in step S2005, the CPU 0101 stores the sheet-feeding sheet types determined in steps S2002 and S2004 in the NVRAM 0105.

The sheet-feeding sheet types are stored herein in the NVRAM 0105 to omit the processing for selecting a sheet type when a sheet is fed for the second and subsequent times. With the recording apparatus 1 that can hold two or more rolls of paper, a roll sheet can be changed to another without removal of the roll sheet from the recording apparatus 1. This allows sheet feeding a plurality of times without removal of the roll sheet from the recording apparatus 1. The processing for feeding a sheet for the second and subsequent times will be described in detail below with reference to FIG. 7.

Upon completion of the processing in step S2005, the processing proceeds to step S2006. In step S2006, the CPU 0101 adjusts the mechanical operation setting for the sheet-feeding sheet type. Then, the processing proceeds to step S2007, and the adjustment of the mechanical operation setting ends.

The mechanical operation setting to be adjusted in step S2006 is a mechanical operation setting adjusted for each sheet type, which is not a mechanical operation setting common to all sheet types. This provides a more suitable subsequent feeding operation based on such a mechanical operation setting than the conventional sheet feeding operation. Examples of the suitable sheet feeding operation includes a sheet feeding operation at a sheet conveyance speed adjusted in consideration of a sheet type. In addition, examples can include sheet feeding operations at an adjusted tension of the roll sheet, at an adjusted strength of sheet suction by the platen, and/or at an adjusted strength at which the conveyance roller pair nip the sheet. In a mechanical operation common to all sheet types, a lowest speed is set. Thus, such a suitable sheet feeding operation may increase a conveyance speed depending on a sheet, reducing the time in sheet feeding.

Figure 7:
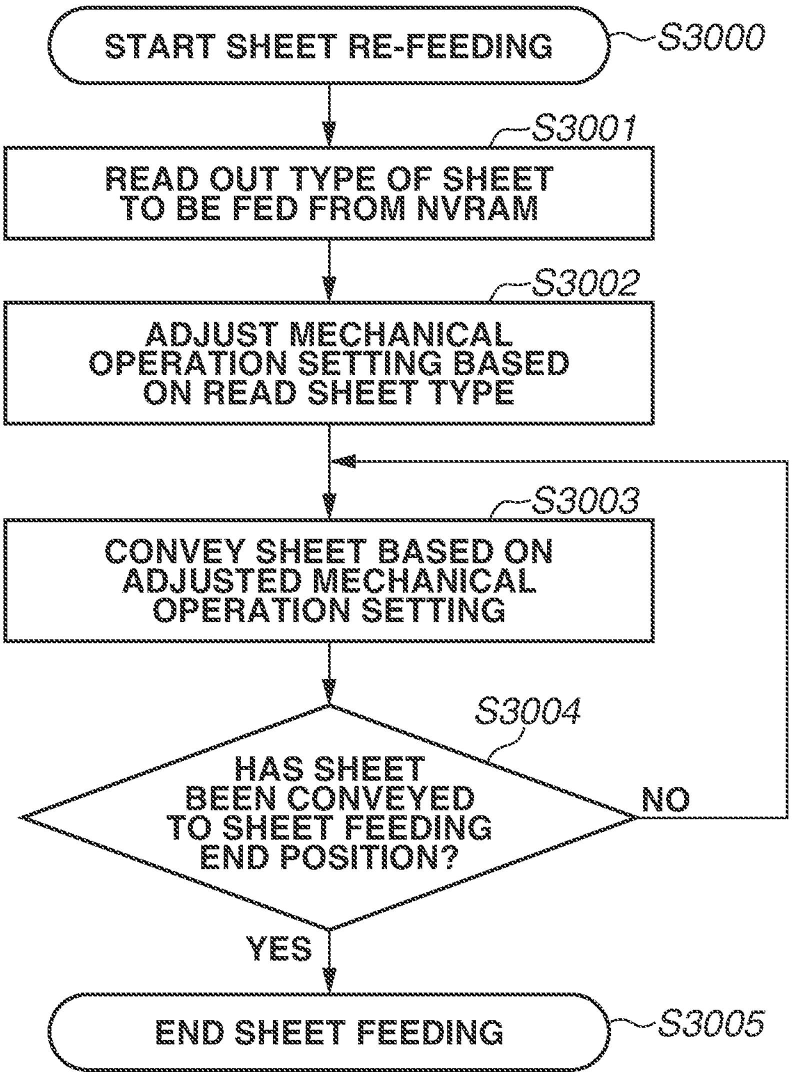
FIG. 7 is a flowchart illustrating processing performed when the sheet is fed for the second and subsequent times according to the present exemplary embodiment.

FIG. 7 is a flowchart illustrating processing performed when sheets are fed for the second and subsequent times according to the present exemplary embodiment. The processing is carried out by CPU 0101 following programs stored in the ROM 0103 to control units.

In response to when a user selects sheet re-feeding on an operation panel of the recording apparatus 1, the processing proceeds to step S3000 in which sheet re-feeding is started. In step S3001, the CPU 0101 first reads out the type of a sheet to be fed from the NVRAM 0105. The sheet type to be read out herein is stored in step S2005 illustrated in FIG. 6. In step S3002, the CPU 0101 adjusts a mechanical operation setting based on the sheet type that the CPU 0101 has read out, in the manner that has been described with reference to FIG. 6.

In step S3003, the recording apparatus 1 conveys the sheet based on the mechanical operation setting adjusted in step S3002. In step S3004, the CPU 0101 determines whether the sheet has been conveyed to the sheet feeding end position. If the CPU 0101 determines that the sheet has not been conveyed to the sheet feeding end position (NO in step S3004), the processing in step S3003 is executed again. The processing in steps S3003 and S3004 is performed a plurality of times, and the sheet is conveyed to the sheet feeding end position. If the CPU 0101 determines that the sheet has been conveyed to the sheet feeding end position (YES in step S3004), the processing proceeds to step S3005 in which the sheet re-feeding ends.

Figure 8:
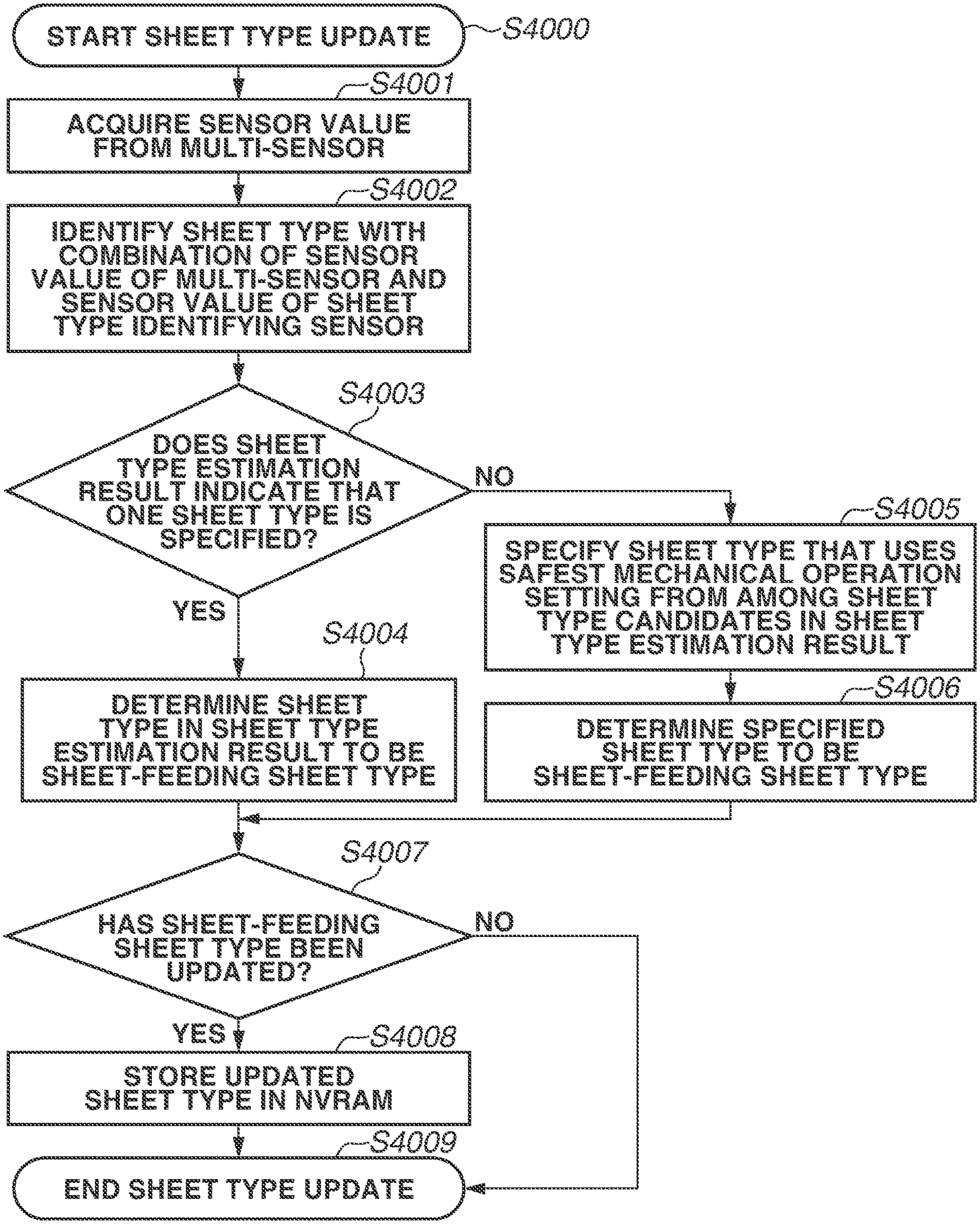
FIG. 8 is a flowchart illustrating processing for updating a result of sheet type measurement subsequent to sheet feeding according to the present exemplary embodiment.

FIG. 8 is a flowchart illustrating processing for updating a result of sheet type measurement subsequent to sheet feeding according to the present exemplary embodiment. The processing is carried out by the CPU 0101 following programs stored in the ROM 0103 to control units.

In the present exemplary embodiment, other than the method in which the sheet type is identified during the sheet feeding, it is conceivable that a sheet type can be identified more precisely by a combination of the sheet type identification during the sheet feeding and sheet type identification using the multi-sensor 0302 after the sheet conveyance. The following will be a description of an exemplary embodiment in which a sensor value acquired from the multi-sensor 0302 is added to identify a sheet type. However, the sensor to be used is not limited to the multi-sensor 0302.

The multi-sensor 0302 is mounted on the carriage 0203, and can perform measurement after sheet feeding is completed, to identify the type of the sheet.

In response to when the multi-sensor 0302 becomes ready for measurement after sheet feeding is completed in the recording apparatus 1, the processing proceeds to step S4000 in which the update of the sheet type is started. In step S4001, the CPU 0101 first acquires a sensor value from the multi-sensor 0302. In step S4002, the sheet type is identified with a combination of a sensor value acquired beforehand by the sheet type identifying sensor 0206 and the sensor value acquired by the multi-sensor 0302. Thus, the CPU 0101 acquires a sheet type estimation result in which the sheet type is identified with the combination of the sensor values of the multi-sensor 0302 and the sheet type identifying sensor 0206. In step S4003, the CPU 0101 determines whether the sheet type estimation result indicates that one sheet type is specified. If the CPU 0101 determines that the sheet type estimation result indicates one sheet type (YES in step S4003), the processing proceeds to step S4004 in which the sheet type is determined to be the sheet-feeding sheet type. On the other hand, if the sheet type estimation result indicates that a plurality of sheet type candidates is present (NO in step S4003), the processing proceeds to step S4005. In step S4005, the sheet type that uses the safest mechanical operation setting is specified from among the sheet type candidates in the sheet type estimation result. Subsequently, in step S4006, the specified sheet type is determined to be the sheet-feeding sheet type.

Then, the processing proceeds to step S4007. In step S4007, the CPU 0101 determines whether the sheet-feeding sheet type has been updated based on comparison with the sheet-feeding sheet type determined at the time of sheet feeding for the first time. If the CPU 0101 determines that the sheet-feeding sheet type has been updated (YES in step S4007), the processing proceeds to step S4008. In step S4008, the CPU 0101 stores the sheet type that is newly determined in the NVRAM 0105. Then, the processing proceeds to step S4009, and the update of the sheet type ends. On the other hand, if the CPU 0101 determines that the sheet-feeding sheet type has not been updated (NO in step S4007), the CPU 0101 does not do anything, and the processing proceeds to step S4009.

The present exemplary embodiment has been described using the example of the recording apparatus. However, the present exemplary embodiment can be applied to a conveyance apparatus as long as the conveyance apparatus conveys a sheet medium.

According to the present exemplary embodiment, a mechanical operation setting about sheet conveyance can be updated during sheet conveyance. This prevents an increase in the amount of time in sheet conveyance. Moreover, the conveyance operation on a sheet based on a mechanical setting depending on the sheet type reduces failures related to the sheet conveyance.

According to the present exemplary embodiment, an increase in the amount of time in conveyance of sheets can be prevented while conveyance failures are reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-071063, filed Apr. 22, 2022, which is hereby incorporated by reference herein in its entirety.

What is claimed is:

1. A conveyance apparatus comprising:

a conveyance roller pair configured to convey a roll sheet;

a first sensor configured to acquire data to be used to identify a roll sheet type of the roll sheet during the sheet conveyance by the conveyance roller pair;

a second sensor different from the first sensor and configured to detect the roll sheet;

a control unit configured to control an operation on the roll sheet based on a result of the data acquisition by the first sensor; and a platen configured to support the roll sheet, wherein the first sensor is disposed between a rolled portion of the roll sheet and the platen on a conveyance path of the roll sheet, wherein the second sensor detects the roll sheet conveyed on the platen after the first sensor has acquired the data, and wherein the second sensor is disposed at a position opposite to the platen.

2. The conveyance apparatus according to claim 1, wherein the control unit is configured to control a conveyance speed of the roll sheet conveyed by the conveyance roller pair based on the result of the data acquisition by the first sensor.

3. The conveyance apparatus according to claim 2, wherein the control unit is configured to control the conveyance roller pair such that the conveyance speed of the roll sheet is higher than a conveyance speed of the roll sheet before the data acquisition by the first sensor.

4. The conveyance apparatus according to claim 2, wherein the control unit is configured to control the conveyance speed of the roll sheet so that the conveyance speed of the roll sheet is changed after the first sensor acquires/has acquired the data and before the second sensor detects the roll sheet.

5. The conveyance apparatus according to claim 1, wherein the platen performs suction of the roll sheet to support the roll sheet, and wherein the control unit is configured to control a strength of the suction performed by the platen.

6. The conveyance apparatus according to claim 1, wherein the conveyance roller pair is configured to convey the roll sheet with the roll sheet nipped by a roller pair, and wherein the control unit is configured to control a strength at which the roller pair nips the roll sheet.

7. The conveyance apparatus according to claim 1, further comprising a storage unit configured to store a setting of the operation to be performed when the roll sheet is conveyed for a first time after the roll sheet is set in the conveyance apparatus, wherein the control unit is configured to control the operation based on the setting stored in the storage unit when the roll sheet is conveyed next time.

8. The conveyance apparatus according to claim 1, further comprising a recording unit configured to record an image on the roll sheet.

9. The conveyance apparatus according to claim 1, further comprising a specifying unit configured to specify the roll sheet type based on the result of the data acquisition by the first sensor, wherein the control unit is configured to control the operation on the roll sheet based on the roll sheet type specified by the specifying unit.

10. The conveyance apparatus according to claim 9, wherein, in a case where the roll sheet type is unable to be specified to one type by the specifying unit, the control unit is configured to control the conveyance roller pair based on a safest operation setting out of a plurality of candidates for the roll sheet type, where the plurality of candidates is specified by the specifying unit.

11. The conveyance apparatus according to claim 10, wherein the second sensor is disposed at a position at which the second sensor acquires data about the roll sheet by detecting the roll sheet after the roll sheet is fed onto the platen, wherein the specifying unit is configured to specify the roll sheet based on the data acquired by the second sensor, and wherein, in a case where the roll sheet based on the data acquired by the first sensor differs from the roll sheet type based on the data acquired by the second sensor, the control unit is configured to control the operation on the roll sheet based on the roll sheet type based on the data acquired by the second sensor when the roll sheet is conveyed next and subsequent times.

12. The conveyance apparatus according to claim 1, further comprising:

a recording unit configured to record an image on the roll sheet; and a carriage on which the recording unit is mounted, wherein the second sensor is mounted on the carriage.

* * * * *